United States Patent [19]

Dischert et al.

[11] Patent Number: 4,520,396
[45] Date of Patent: May 28, 1985

[54] FM VIDEO TRANSMISSION SYSTEM HAVING CORING AND CORING COMPENSATION FOR REDUCING EFFECTS OF TRIANGULAR NOISE

[75] Inventors: Robert A. Dischert, Burlington; Robert L. Libbey, Cherry Hill, both of N.J.

[73] Assignee: RCA Corporation, Princeton, N.J.

[21] Appl. No.: 517,028

[22] Filed: Jul. 25, 1983

[51] Int. Cl.$^3$ .......................... H04N 5/21; H04B 1/10
[52] U.S. Cl. ...................................... 358/167; 358/36; 328/167
[58] Field of Search .......................... 358/167, 36, 166; 328/167; 333/14; 455/42, 70, 72, 103, 110

[56] References Cited

U.S. PATENT DOCUMENTS 3,715,477  2/1973  Olson et al. ...................... 178/5.4 R
4,009,334  2/1977  Sypula ................................. 358/167

OTHER PUBLICATIONS

"Digital Techniques for Reducing Television Noise", by John P. Ross, SMPTE Journal, Mar. 1978, vol. 87, pp. 134–140.

Primary Examiner—John C. Martin
Assistant Examiner—E. Anne Toth
Attorney, Agent, or Firm—P. J. Rasmussen; P. M. Emanuel; R. G. Coalter

[57] ABSTRACT

A video FM transmission system includes a transmitter coupled to a receiver by means of an FM transmission path subject to triangular noise effects. The receiver includes a coring circuit for reducing the noise and the transmitter includes a coring compensation circuit having a transfer function different from and not complementary to the transfer function of the coring circuit. The transfer functions are selected so as to effect greater coring of the triangular noise characteristic of the FM transmission system and lesser coring of the desired small-signal high-frequency components of the video signal thereby providing a desired signal-to-noise ratio enhancement of the video. In preferred embodiments of the invention the transfer functions of both the coring circuit and the coring compensation circuit are provided by programmed read only memories having different and non-complementary programs.

5 Claims, 8 Drawing Figures

| SYSTEM HF RESPONSE ||||
|---|---|---|---|
| COMPENSATOR || CORING ||
| IN | OUT | IN | OUT |
| +20 | +28 | +28 | +20 |
| +18 | +26 | +26 | +18 |
| +16 | +24 | +24 | +16 |
| +14 | +22 | +22 | +14 |
| +12 | +20 | +20 | +12 |
| +10 | +18 | +18 | +10 |
| +8 | +16 | +16 | +8 |
| +6 | +12 | +12 | +4 |
| +4 | +8 | +8 | 0 |
| +2 | +4 | +4 | 0 |
| 0 | 0 | 0 | 0 |
| -2 | -4 | -4 | 0 |
| -4 | -8 | -8 | 0 |
| -6 | -12 | -12 | -4 |
| -8 | -16 | -16 | -8 |
| -10 | -18 | -18 | -10 |
| -12 | -20 | -20 | -12 |
| -14 | -22 | -22 | -14 |
| -16 | -24 | -24 | -16 |
| -18 | -26 | -26 | -18 |
| -20 | -28 | -28 | -20 |

CORING REGION

*Fig. 5*

COMPENSATION ROM PROGRAM

| ADDRESS | | DATA |
|---|---|---|
| UNSIGNED BINARY | SIGNED BINARY | SIGNED BINARY |
| 137 | +9 | +17 |
| 136 | +8 | +16 |
| 135 | +7 | +14 |
| 134 | +6 | +12 |
| 133 | +5 | +10 |
| 132 | +4 | +8 |
| 131 | +3 | +6 |
| 130 | +2 | +4 |
| 129 | +1 | +2 |
| 128 | 0 | 0 |
| 127 | -1 | -2 |
| 126 | -2 | -4 |
| 125 | -3 | -6 |
| 124 | -4 | -8 |
| 123 | -5 | -10 |
| 122 | -6 | -12 |
| 121 | -7 | -14 |
| 120 | -8 | -16 |
| 119 | -9 | -17 |

Regions (left side): UNITY GAIN — 6 dB GAIN REGION — UNITY GAIN

CORING ROM PROGRAM

| ADDRESS | | DATA |
|---|---|---|
| UNSIGNED BINARY | SIGNED BINARY | SIGNED BINARY |
| 138 | 10 | 2 |
| 137 | 9 | 1 |
| 136 | 8 | 0 |
| 135 | 7 | 0 |
| 134 | 6 | 0 |
| 133 | 5 | 0 |
| 132 | 4 | 0 |
| 131 | 3 | 0 |
| 130 | 2 | 0 |
| 129 | 1 | 0 |
| 128 | 0 | 0 |
| 127 | -1 | 0 |
| 126 | -2 | 0 |
| 125 | -3 | 0 |
| 124 | -4 | 0 |
| 123 | -5 | 0 |
| 122 | -6 | 0 |
| 121 | -7 | 0 |
| 120 | -8 | 0 |
| 119 | -9 | 1 |
| 118 | -10 | 2 |

Regions (right side): LINEAR REGION — CORING REGION — LINEAR REGION

8 UNITS OF CORING FOR NOISE
4 UNITS OF CORING FOR DATA

*Fig. 8*

FM VIDEO TRANSMISSION SYSTEM HAVING CORING AND CORING COMPENSATION FOR REDUCING EFFECTS OF TRIANGULAR NOISE

FIELD OF THE INVENTION

The present invention relates to video transmission systems and particularly to systems in which the video information is conveyed by means of frequency modulation of a carrier wave and in which the FM receiving portion of the system includes a coring circuit subsequent to an FM demodulator for signal-to-noise ratio enhancement of high frequency portions of the video signal.

BACKGROUND OF THE INVENTION

Video transmission systems which employ some form of angle modulation (e.g., frequency or phase modulation) of a carrier wave to convey the video information are well known. Examples include Video Tape Recorders (VTR's) and satellite transmission systems of the type employing FM transponders for relaying the video signal.

It is known that video FM transmission systems are subject to a form of noise known as "triangular" noise. Triangular noise is characterized by noise power which increases with frequency as compared with Gaussian or White noise wherein the noise power is constant with frequency or so-called "1/F" where the noise power increases with decreasing frequency.

It is known to use preemphasis of the high-frequency portions of a video signal before FM modulation to amplify those high-frequency portions before transmission over the FM link, followed by a deemphasis to reduce the amplitude of the high-frequency components to the then correct relative value. However, the dynamic range of the FM system must be increased to accommodate the preemphasized signal.

It is known that an improvement in the signal-to-noise ratio (S/N) of the displayed image of a television receiver may be obtained by the method of separating the video signal into high frequency (HF) and low frequency (LF) components, coring the HF component and then adding the non-cored LF component to the cored HF component. Examples of analog circuits which provide noise reduction by coring include U.S. Pat. No. 3,715,477 entitled, Video Signal Noise Limiting Apparatus which issued Feb. 6, 1973, to Olson et al. and U.S. Pat. No. 4,009,334 entitled, Video Noise Reduction Circuit which issued to R. J. Sypula, Feb. 22, 1977. Such circuits completely eliminate noise having amplitudes less than the coring threshold.

Coring is, of course, not limited to analog circuit implementations. An example of a digital coring circuit is provided in the article "Digital Techniques for Reducing Television Noise" by John P. Ross which was published in March, 1978, in the SMPTE Journal, Vol. 87, pp 139–140.

SUMMARY OF THE INVENTION

It is recognized herein that coring the video signal undesirably removes both the desired low-level high frequency signal components as well as the undesired low level high frequency components of the triangular noise characteristic of the FM video transmission channel.

Stated another way, regardless of whether coring is performed by means of analog or digital circuitry, the net effect is that all high frequency signal components lying within the coring region are completely removed from the cored signal. The components thus removed include desired components (i.e., signal components) and the undesired components (e.g., the triangular noise) components characteristic of the FM transmission channel.

In accordance with the invention, it is recognized that a need exists for an FM video transmission system in which the "coring range" of the undesired video components is greater than the "coring range" of the desired video components. The present invention is directed to meeting this need.

In accordance with the invention, an FM video transmission system includes a receiver means having a predetermined coring range in which the receiver gain is essentially zero for high frequency components of a received video signal having amplitudes lying within a predetermined range of values. The receiver means is coupled to a transmitter means via an FM data link. The transmitter means includes circuit means for amplifying low level high frequency components which lie within the predetermined range of the receiver coring unit.

BRIEF DESCRIPTION OF THE DRAWING

The invention is illustrated in the following drawing figures wherein like elements are denoted by like designators and in which:

FIG. 5 is a table illustrating the system response of FIG. 1;

FIG. 8 is a table illustrating program data for the ROMs of FIGS. 6 and 7.

DESCRIPTION OF THE EMBODIMENTS

Figure 1:
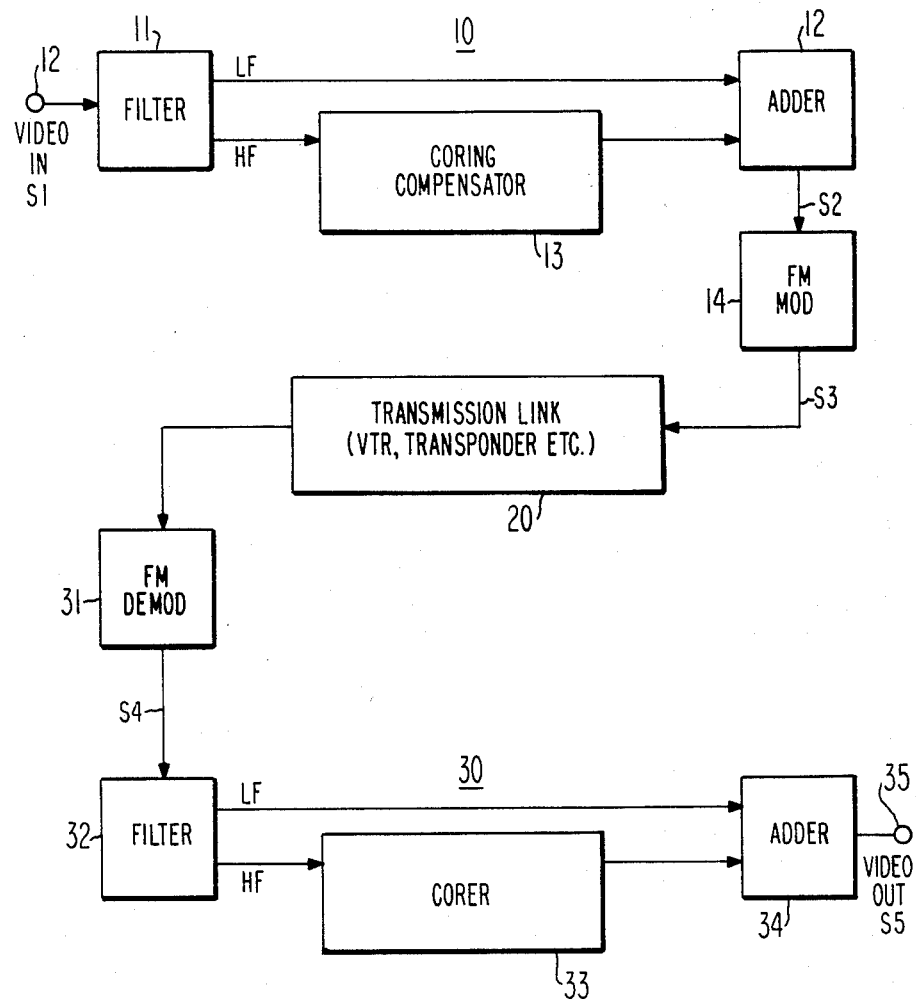
FIG. 1 is a block diagram of an FM video transmission system embodying the invention.

The video transmission system of FIG. 1 comprises a transmitter or "sending" unit 10, an FM transmission link 20 (e.g., a video tape recorder or a satellite transponder system, etc.) and a receiving unit 30. Unit 10 includes a filter 11 having an input 12 for receiving a baseband video input signal S1 and two outputs for providing a high frequency component (HF) of the signal S1 and a low frequency component (LF) of the signal S1. The filter 11 may be of the so-called "comb" type described in the Olson et al. patent or it may be of the analog filter type described in the Sypula patent. In a preferred embodiment of the invention filter 11 is implemented as a comb filter utilizing digital (rather than analog) techniques.

Figure 2:
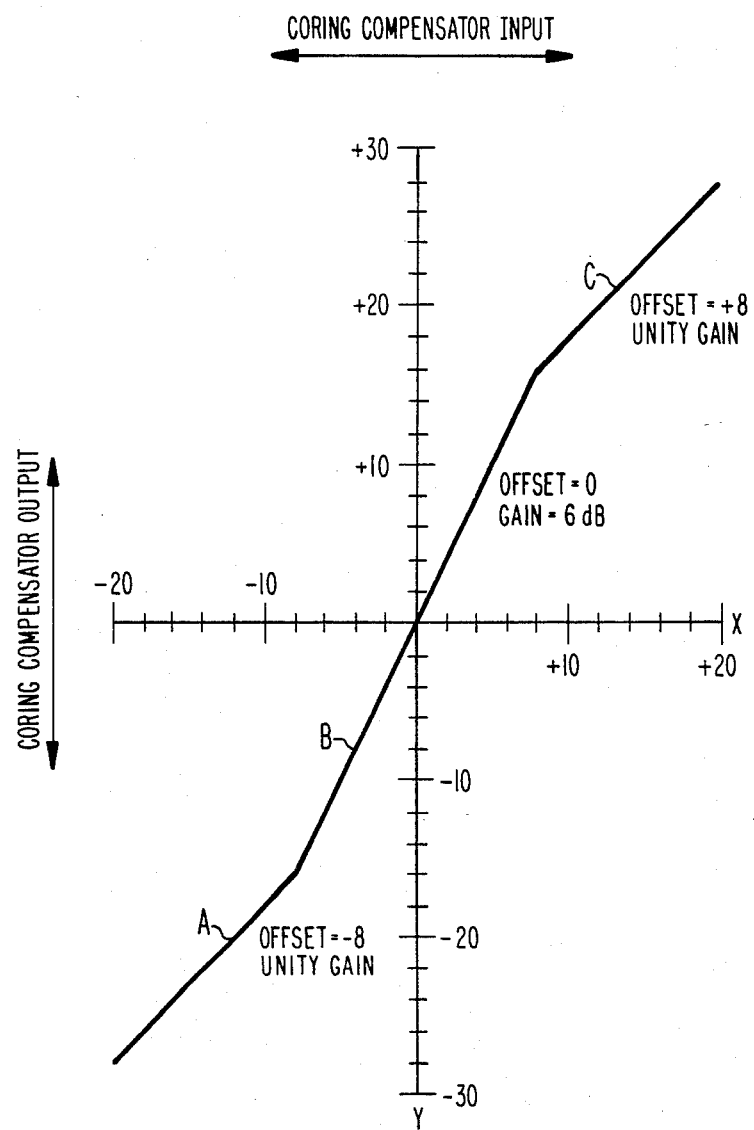
FIG. 2 is a graph illustrating the transfer function of the coring compensator of the system of FIG. 1.

The signal LF is applied directly to one input of an adder 12 and the signal HF is applied to the other input of adder 12 via a coring compensator unit 13. The amplitude transfer function of unit 13 is illustrated by FIG. 2. The horizontal axis (X) represents the range of values of the input signal HF and the vertical axis (Y) represents the corresponding range of values of the output signal HF as modified in unit 13. From the portion "A" of the transfer curve it will be noted that the output signal HF is linearly related to the input signal with unity incremented gain but with an offset of −8 units (the term "units" as used herein may correspond to units of voltage or current). In region "B" of the transfer curve from −8 units to +8 units the curve has a slope of ×2 (times two) and no offset. The greater slope in region B represents a gain of 6 dB for signal components lying in the range from −8 to +8 units. Region "C" of the transfer function has a unity slope (representing zero gain) and an offset of +8 units.

Summarizing the foregoing, the Coring Compensator unit 13 amplifies small signal high frequency components of signal S1 by 6 dB. The gain of unit 13 is unity for HF components of signal S1 which are more negative than −8 units and provides an offset of −8 units. For HF components of the signal S1 which are more positive than +8 units, unit 13 exhibits unity gain and provides a +8 unit offset. Since only the central portion of the transfer function exhibits relatively high gain and the gain is lower over the remainder of the transfer function, the dynamic range of the signal is not increased as much as in the case of the preemphasis method of noise reduction.

The unmodified LF component of signal S1 is added to the modified HF component of signal S1 via adder 12 and the resultant summed signal S2 is applied to a frequency modulator 14 which, in turn, provides an FM output signal S3 proportional to signal S2. Signal S3 is applied via the transmission link 20 to the input of an FM demodulator 31 of the receiving unit 30 to provide a demodulated (i.e., baseband) video output signal S4.

The signal S4 in receiving unit 30 includes the offset unity gain LF components of signal S1, the non-offset and amplified low level HF component of signal S1 and triangular noise introduced by the FM transmission link (14, 20 and 31). Signal S4 is applied to filter 32 in receiving unit 30 which separates the LF and HF components of signal S4 in the same manner as filter 11 in the transmitting unit 10. The LF component is applied directly to one input of adder 34 and the HF component is applied via corer unit 33 to the other input of adder 34 to provide a noise reduced video output signal S5 the output 35 of adder 34.

Figure 3:
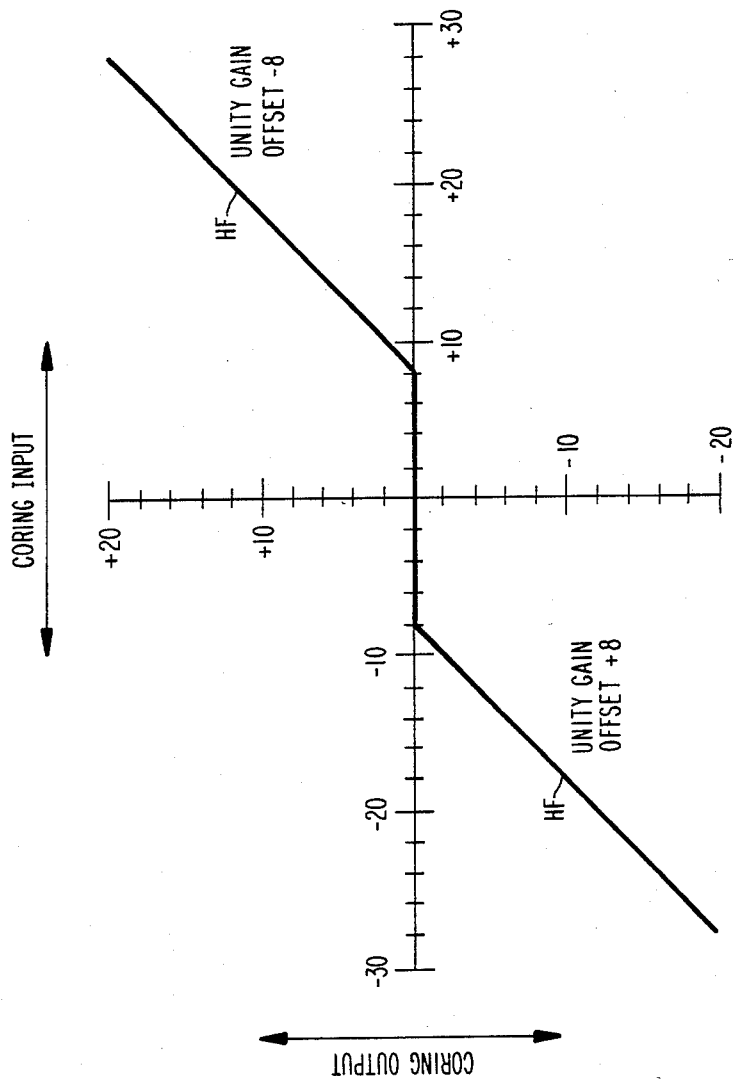
FIG. 3 is a graph illustrating the transfer function of the coring unit of FIG. 1.

FIG. 3 represents the transfer function of corer 33. As shown, corer 33 removes all components of signal HF which lie within the range from −8 units to +8 units. This includes the noise component introduced in the FM transmission path and the HF component produced by compensator 13. Since unit 13 amplifies small signal HF components before FM transmission, the effect of subsequent coring is to reduce the signal component by 4 units which reducing the noise component by eight units thereby improving the S/N ratio of the overall transmission system.

Figure 4:
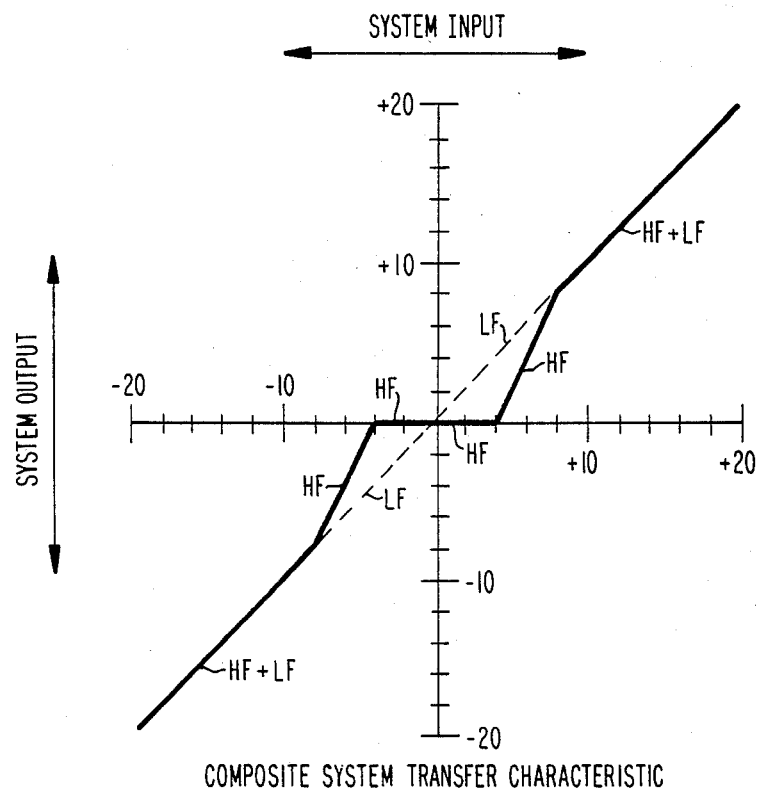
FIG. 4 is a graph illustrating the combined effects of the transfer functions of FIGS. 2 and 3.

This improvement in signal-to-noise ratio is illustrated in FIG. 4 which represents the composite system transfer function. As illustrated, LF signal components are not altered in any respect and they are linear as shown by the dashed line passing through the origin of the system transfer function. Linearity for the HF component results from the fact that the coring compensator introduces positive and negative offsets for HF components which exactly match the positive and negative coring levels (−8 and +8 units) provided by coring unit 33. As seen from the composite system transfer function, the HF components are cored only from −4 to +4 units. This results from the +6 dB amplification of low level HF signals in unit 13 as shown in FIG. 2. Noise, introduced in the FM transmission path subsequent to the signal amplification provided by unit 13 is not amplified and so is cored by the full amount (−8 units to +8 units) in corer 33.

The foregoing is further illustrated in numerical form by the Table of FIG. 5. The first two columns represented specific values of the compensator 13 input and output signals. The second two columns represent the input/output values for coring unit 33. It will be noted that as the compensator input signal varies from −4 to +4 units, its output signal varies by twice that amount (−8 to +8) units. Noise introduced in the signal path between the transmitter and the receiver is not preferentially amplified by 6 dB in the small signal region of the video signal. As a result, coring has the effect of eliminating low level signal components only in the range between −4 and +4 units whereas all noise components are eliminated in the range from −8 to +8 units.

Figure 6:
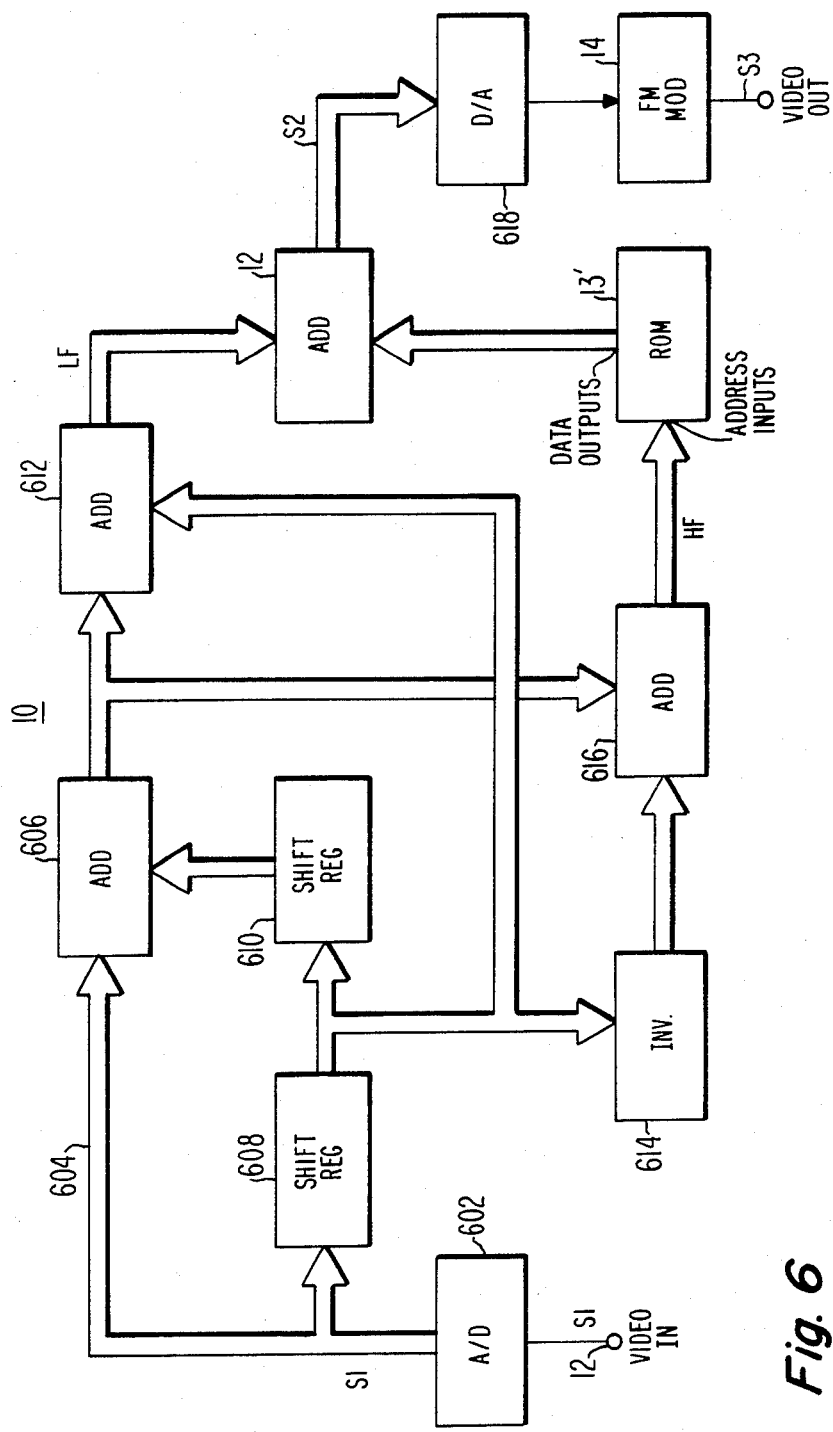
FIG. 6 is a block diagram of the transmitter portion of the system of FIG. 1.

FIG. 6 is exemplary of a digital implementation of the transmitter portion of the system of FIG. 1. The analog video signal S1 is applied to the input terminal 12 of an analog-to-digital (A/D) converter 602 which will be assummed to be a standard eight bit flash converter. The 8 bit parallel signal S1 is applied via bus 604 to a first input of a binary adder 606 and to the input of a cascade connection of two cascade connected shift registers 608 and 610. The digital LF component is obtained by coupling the output of register 610 to the second input of adder 606 and adding the output of register 608 to the output of adder 606 by means of adder 612.

The HF binary component of signal S1 is obtained by inverting the output of register 608 by means of inverter 614 and adding the inverted signal to the output of adder 606 by means of adder 616. A read only memory 13', programmed in accordance with the tabulated data of FIG. 8 in the "Compensation ROM Program" provides the transfer function previously shown and described in connection with FIG. 2. The address inputs of ROM 13' are coupled to receive the HF data provided by adder 616 and the data outputs of ROM 13' are added to the LF output data of adder 612 by means of adder 12. The resultant digital signal S2 produced at the output of adder 12 is converted to an analog signal by means of a digital-to-analog converter 618 and applied to a frequency modulator 14 which produces the FM signal S3 for transmission to the receiver 30 via the transmission link 20. Aside from the use of digital filtering techniques, overall operation of the transmitter 10 is the same as previously described in connection with FIG. 1. The advantage of this digital implementation is that the circuitry may be integrated thereby improving reliability, minimizing drift and reducing the overall cost of the system.

Figure 7:
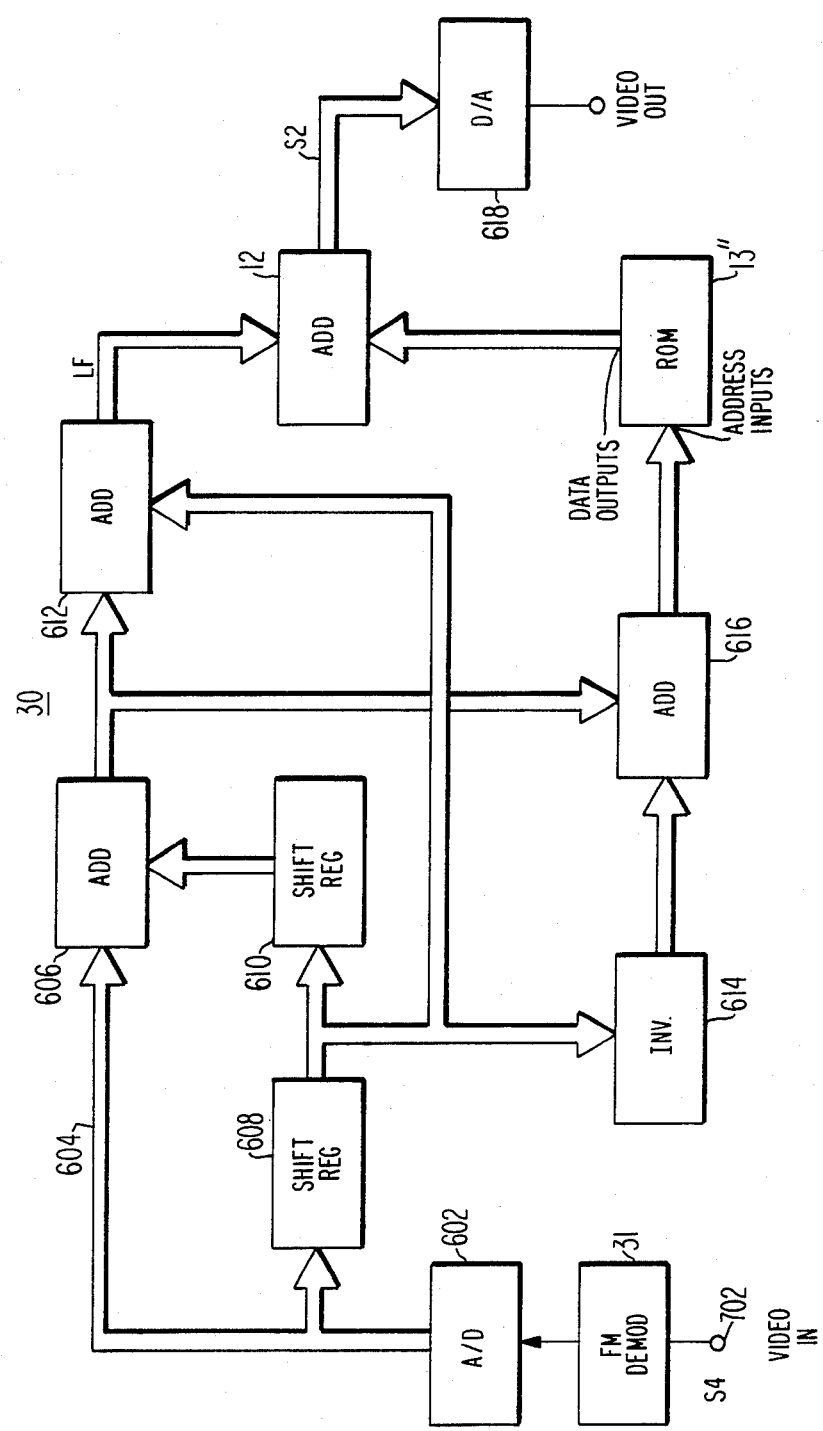
FIG. 7 is a block diagram of the receiver portion of the system of FIG. 1.

FIG. 7 is essentially identical to FIG. 6 but differs in that the input of A/D converter 602 is obtained via an FM demodulator 31 which receives the video signal S4 at its input terminal 702. Also, FM modulator 14 is deleted and the output signal is taken directly from the output of D/A converter 618. The major difference is that ROM 13" is programmed with the coring routine shown in FIG. 8. Both of the ROM programs have addresses expressed in terms of unsigned and signed binary arithmetic. For video signals quantized to eight bits, the ROMs may be of relatively small size (e.g., 256 bytes). If desired the arithmetic and processing of both the receiver and the transmitter may be done in serial, rather than parallel fashion.

What is claimed is:

1. In a transmission system of the type including input means for receiving an input signal to be transmitted, modulator means responsive to said input signal for imparting angle modulation to a carrier wave, a transmission path for coupling said angle modulated carrier wave to a receiver means, said receiver means including means for demodulating said carrier wave and for separating the demodulated carrier wave into high frequency and low frequency portions, means for coring said high frequency portion and means for adding the cored high frequency portion to said low frequency portion to form a output signal, the improvement for enhancing the signal-to-noise ratio of said cored high frequency portion of said demodulated carrier wave, characterized in that said input means comprises:

(a) filter means for separating said input signal into high frequency portions and low frequency portions;

(b) first circuit means for effectively amplifying a central portion of said high frequency portion and for imparting a predetermined offset to the remaining portions of said high frequency portion to form a modified high frequency portion;

(c) second circuit means for combining said low frequency portion with said modified high frequency portion to form a resultant signal; and (d) modulator means responsive to said resultant signal for forming said angle modulated carrier wave.

2. A transmission system as recited in claim 1 wherein said first circuit means effectively imparts a gain of about 6 dB to said central portion of said high frequency signal.

3. A transmission system as recited in claim 1 wherein said predetermined offset provided by said first circuit means corresponds essentially to the coring range limits of said coring means.

4. A transmission system as recited in claim 2 wherein said first circuit means and said coring means each comprises a respective read-only memory means having different and non-complementary data stored therein.

5. A transmission system as recited in claim 3 wherein said first circuit means and said coring means each comprises a respective read-only memory means having different and non-complementary data stored therein.

* * * * *